United States Patent [19]
Feustel et al.

[11] 4,014,219
[45] Mar. 29, 1977

[54] STEERING SHAFT COUPLING

[75] Inventors: James R. Feustel, Ann Arbor; Alex Rhodes, Orchard Lake, both of Mich.

[73] Assignee: Ford Motor Company, Dearborn, Mich.

[22] Filed: Nov. 10, 1975

[21] Appl. No.: 630,568

[52] U.S. Cl. ................................. 74/492; 403/353; 403/378
[51] Int. Cl.² ...................... B62D 1/18; F16D 1/02
[58] Field of Search ............. 74/492, 493; 403/353, 403/378

[56] References Cited

UNITED STATES PATENTS

| | | | |
|---|---|---|---|
| 653,397 | 7/1900 | Pettijohn | 403/353 |
| 721,427 | 2/1903 | Cope | 403/353 |
| 2,630,303 | 3/1953 | Krucker | 403/353 X |
| 3,424,263 | 1/1969 | Black | 74/492 X |
| 3,472,093 | 10/1969 | Tenniswood | 74/492 |
| 3,477,307 | 11/1969 | Maddox | 74/492 |
| 3,600,971 | 8/1971 | Scarvelis et al. | 74/492 |
| 3,665,777 | 5/1972 | Jensen | 74/492 |
| 3,776,062 | 12/1973 | Ito | 74/492 |

*Primary Examiner*—Allan D. Herrmann
*Attorney, Agent, or Firm*—Clifford L. Sadler; Keith L. Zerschling

[57] ABSTRACT

A steering shaft coupling for a motor vehicle steering column constructed to join a steering shaft with a steering gear. The coupling has a pair of coupling parts and interconnecting members assembled to transmit driving torque from the steering shaft to the steering gear during normal operating conditions. The interconnecting members disengage the coupling parts when the steering gear is displaced axial toward the steering shaft in response to an axial force whereby said axial force will not be transmitted to the steering shaft.

5 Claims, 4 Drawing Figures

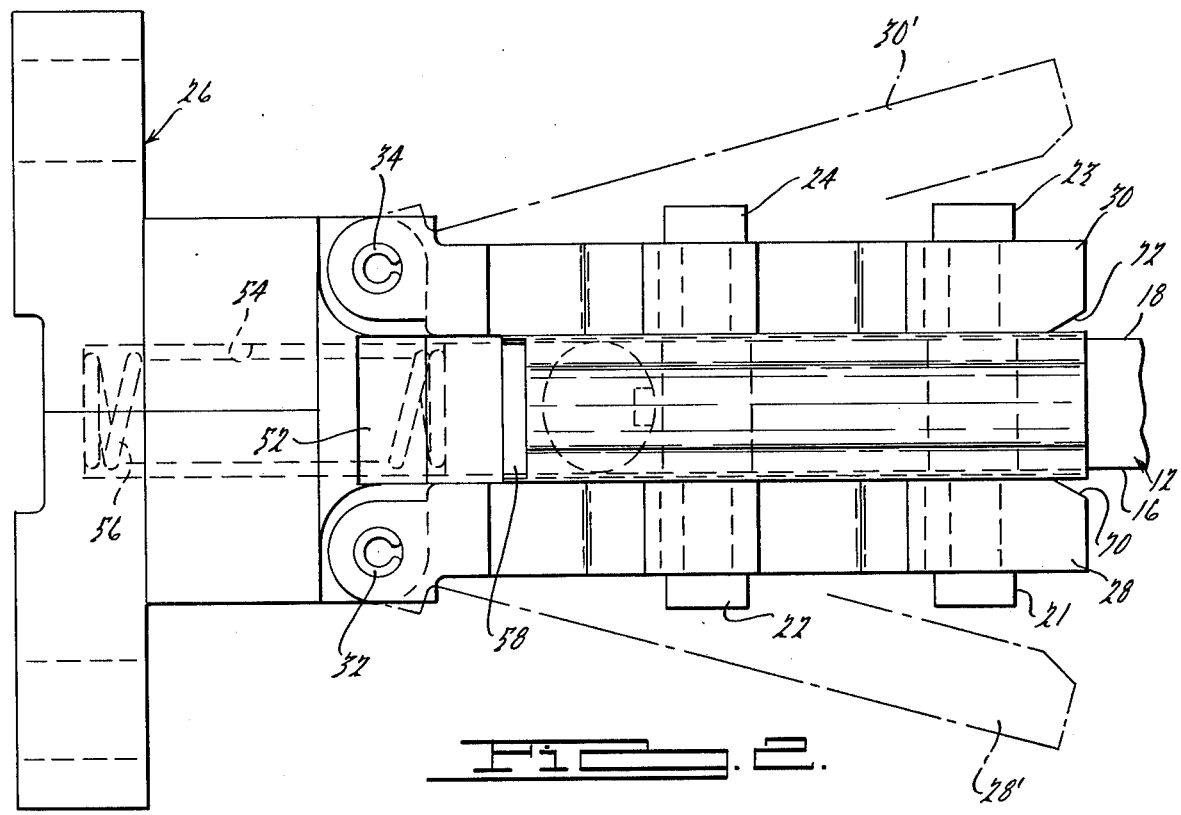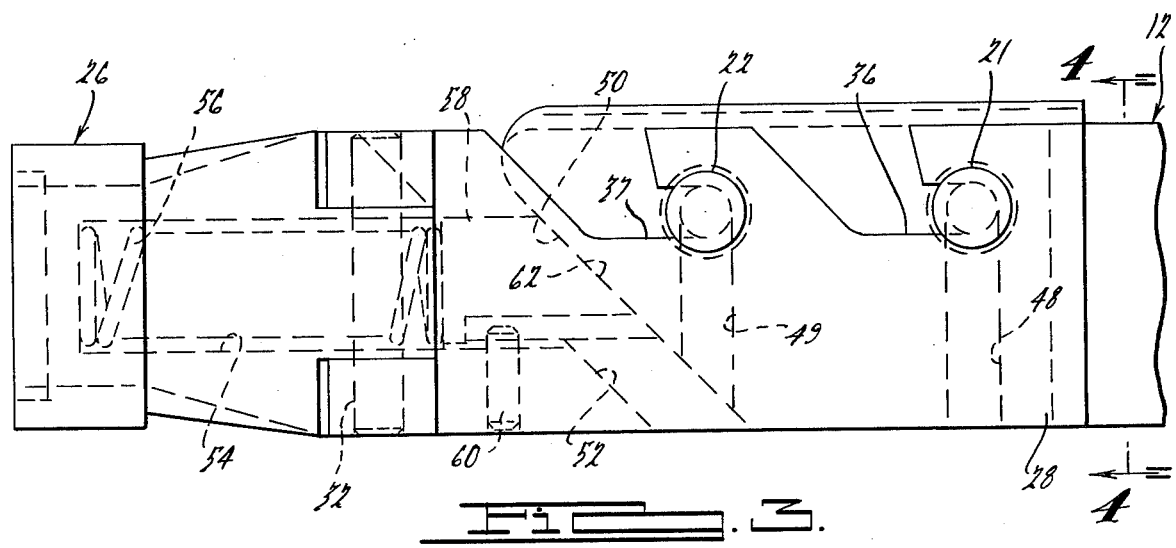

STEERING SHAFT COUPLING

BACKGROUND OF THE DISCLOSURE

The present disclosure relates to a steering shaft coupling for a motor vehicle, and more particularly to a releasable coupling that is constructed to transmit torque from the steering shaft to the steering gear during normal driving conditions and which is releasable upon axial displacement of the steering shaft or the steering gear whereby the axial force causing displacement will not be transmitted through the coupling. A steering shaft coupling according to this patent provides an improvement over prior art devices such as shown in U.S. Pat. Nos. 3,472,093 and 3,477,307.

BRIEF SUMMARY OF THE DISCLOSURE

The coupling of this disclosure drivingly connects the steering shaft of a motor vehicle steering system with a steering gear. The steering shaft has a steering wheel secured to its upper end. The lower end of the coupling is connected to the input of a steering gear. In the illustrated embodiment of the invention, the end of the steering shaft has a pair of flat lateral sides from which abutment members extend. A coupling part pivotally supports a pair of interconnecting members. The interconnecting members have hook shape portions which engage the abutments extending from the sides of the shaft.

A spring supported by the coupling part engages the end of the shaft and urges its abutment members into a seated condition in the hook shape portions of the interconnecting members. A leaf type anti-rattle spring supported by the end of the shaft urges the interconnecting members laterally into engagement with heads formed on the abutment members. The end of the shaft has a ramp surface that is spaced apart from a ramp surface formed on the coupling part.

During normal driving conditions, the interconnecting members form a means for transmitting torque from the steering shaft to the coupling part which, in turn, is connected to the input of a steering gear.

In the event an impact force in a forward direction is imposed upon the steering wheel tending to drive the steering shaft forwardly toward the steering gear, the interconnecting members will disengage from the abutment members of the steering shaft and the shaft will be free to be displaced forwardly whereby the normally spaced apart ramp surfaces will cause the end of the steering shaft to be moved radially as it moves forwardly and, thereby, out of engagement with the coupling part. As a result, the steering gear cannot function as a reaction member resisting forward displacement of the steering shaft upon an impact load. The steering shaft will be free to move forwardly under the impact load. Conversely, if an impact force should be imposed upon the steering gear tending to drive it rearwardly, the coupling will disconnect the gear from the end of the steering shaft whereby that impact force would not be transmitted into the steering shaft and the steering wheel.

BRIEF DESCRIPTION OF THE DRAWINGS

The many objects and advantages of a steering shaft coupling constructed in accordance with this invention will become apparent upon consideration of the following detailed discussion and the accompanying drawings, in which:

FIG. 2 is a top plan view of the steering shaft coupling of FIG. 1;

FIG. 3 is a side elevational view of the steering shaft coupling; and

DETAILED DESCRIPTION OF THE PRESENTLY PREFERRED EMBODIMENT

Figure 1:
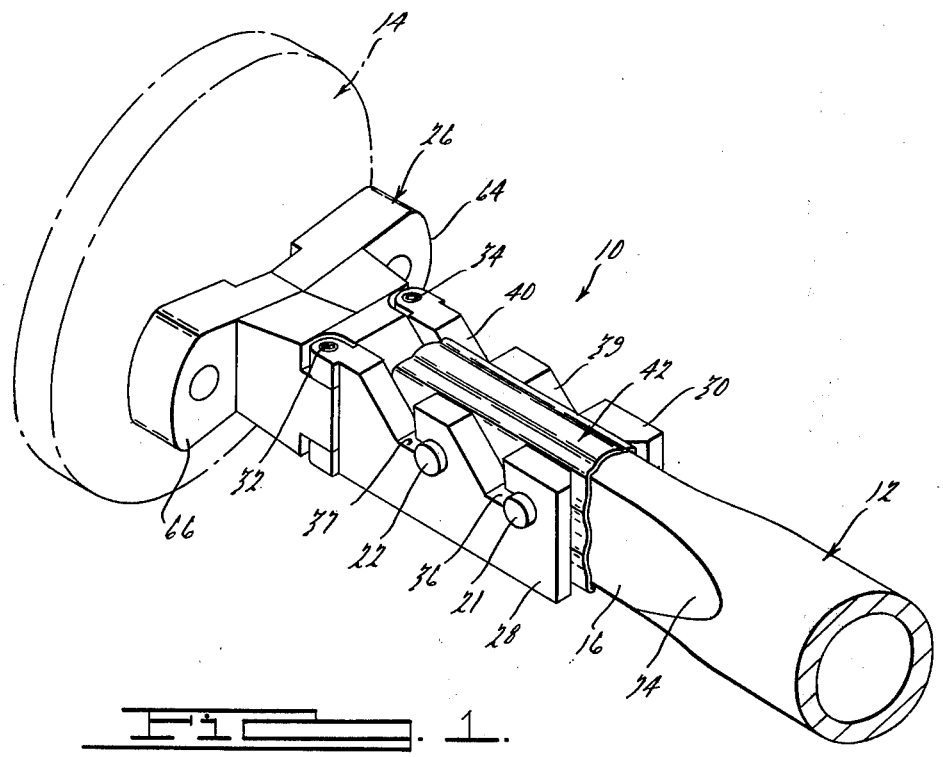
FIG. 1 is a perspective view of a steering shaft coupling embodying the preferred form of the invention.
Figure 4:
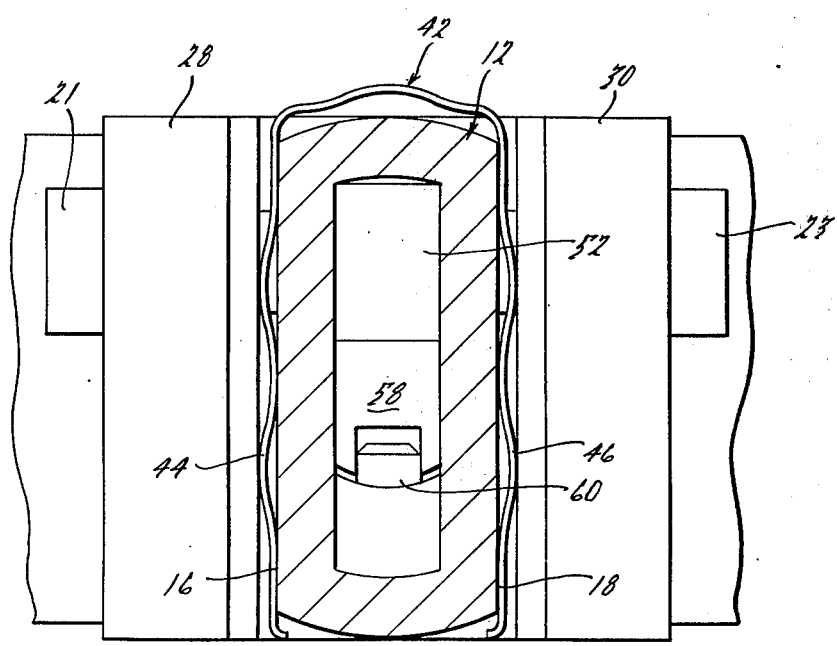
FIG. 4 is a sectional view taken along section line 4—4 of FIG. 3.

Referring to FIG. 1, a steering shaft coupling 10 interconnects a steering shaft 12 with the flexible member 14 of a flexible coupling drivingly connected to the input shaft of a steering gear (not shown). The shaft 12 has a steering wheel (not shown) connected to its rearward end and the coupling 10 provides a means for transmitting steering torque from the steering wheel to the steering gear.

The end of the steering shaft 12, which constitutes a coupling part of the coupling assembly 10, has a pair of flat parallel sides 16 and 18. Pin shape attachment members or abutment members 21 and 22 extend from the lateral side 16. Each of the pins 21, 22 has a shank portion and an enlarged head portion. Similarly, pins 23 and 24 extend from the lateral side 18 of the shaft 12 and these pins also have shank portions and enlarged head portions.

The coupling 10 includes a coupling part 26 to which first and second interconnecting members 28 and 30 are pivotally connected by hinge pins 32 and 34. Interconnecting part 28 has first and second hook shape recesses 36 and 37. The shanks of the abutment pins 21 and 22 are seated in the hook shape recesses 36 and 37, respectively. Similarly, the other interconnecting member 30 has hook shape recesses 39 and 40 in which the shanks of the abutment pins 23 and 24 are seated.

A generally U-shape anti-rattle spring 42 of leaf spring construction straddles the end of the steering shaft 12 and has depending side portions 44 and 46 of wavy configuration. Slots, such as slots 48 and 49, are formed in the sides 44 and 46 of the spring 42 in order to permit it to slip over the shaft 12 and provide clearance with respect to the laterally extending abutment pins 21, 22, 23 and 24. The side 44 of the spring 42 is interposed between the flat side 16 of the shaft 12 and the interconnecting member 28. Its wavy configuration exerts a spring force urging the interconnecting member 28 radially outwardly. Similarly, the wavy side 46 of the spring 42 if interposed between the flat side 18 and the interconnecting member 30 and it urges the member 30 radially outwardly. The spring 42 urges the members 28 and 30 into engagement with the heads of the abutment pins 21, 22, 23 and 24 and maintains them in a tight nonrattling relationship.

The end of the shaft 12 is provided with a sloping ramp surface 50 which is spaced apart from a complementary ramp surface 52 formed on the coupling part 26. The coupling part 26 has an internal bore 54 in which a coil spring 56 is seated. The coil spring engages the end of a plug 58 that is slidable in the bore 54. A lock pin 60 that protrudes into the bore 54 prevents the spring 56 from expelling the plug 58 from the bore 54. The end of the plug 58 has a sloping surface 62 which engages the ramp surface 50 at the end of the shaft 12.

The coupling part 26 has laterally extending ears 64 and 66 which constitute a yoke or flange for connecting the coupling 10 to the flexible member 14 of the universal joint which, in turn, is connected to the vehicle steering gear.

OPERATION

FIG. 1 illustrates the coupling 10 in its normal configuration when installed in a motor vehicle where it provides a driving connection between the steering shaft 12 and the steering gear. In this arrangement, torque will be transmitted from the shaft 12 through the pins 21, 22, 23 and 24 to the interconnecting members 28 and 30 and from there to the coupling part 26 which is connected to the steering gear. The coil spring 56 urges the shaft 12 rearwardly with respect to the coupling part 26 so that the pins 21 and 22 are urged into well seated engagement with the hook shape portions 36 and 37, respectively. Similarly, the force of the spring 56 urging the shaft 12 rearwardly will cause the pins 23 and 24 to be well seated in the hook shape portions 39 and 40 of the other interconnecting member 30. The spring 42 urges the interconnecting members 28 and 30 radially outwardly into engagement with the heads of the pins 21, 22, 23 and 24 so as to prevent rattling.

In the event an impact load is imposed upon the steering shaft 12 causing it to move forwardly, the pins 21, 22, 23 and 24 will move out of engagement with the hook shape portions 36, 37, 38 and 40. The sloping surface 50 at the end of the shaft 12 will come into the contact with the ramp surface 52 of the coupling part 26. The plug 26 will retreat into the bore 54 when the sloping end 50 of the shaft 12 engages the ramp surface 52 of the coupling part 26. Further displacement will cause the end of the shaft 12 and the coupling part 26 to separate radially.

As seen in FIG. 2, the rear inner edges of the interconnecting members 28 and 30 are beveled to form sloping surfaces 70 and 72. The rearward ends of the sides 16 and 18 of the shaft 12 have sloping surfaces where they blend into the cylindrical exterior shape of the shaft. One such surface is identified by reference numeral 74 in FIG. 1. When the sloping surfaces of the shaft 12 engage the beveled surfaces 70 and 72 upon axial displacement of the shaft 12, the interconnecting members 28 and 30 will be forced to swing outwardly to the dotted-line position 28' and 30' of FIG. 2. With the interconnecting members 28 and 30 pivoted outwardly to the position 28' and 30°, the shaft 12 is disconnected from the coupling part 26 and no torque can be transmitted from the steering shaft to the steering gear.

Thus, a steering shaft coupling is provided in accordance with this invention for transmitting torque from a steering shaft to a steering gear during normal operating conditions but which will readily disengage so that rearward displacement of the steering gear will not cause rearward displacement of the steering shaft and, conversely, forward displacement of the steering shaft will not be resisted.

The foregoing description presents the presently preferred embodiment of this invention. Details of construction have been shown for purposes of illustration and are not to be considered limitations of the invention. Modifications and alterations may occur to those skilled in the art which will come within the scope and spirit of the following claims.

We claim:

1. A shaft coupling having a first coupling part, a second coupling part and an interconnecting member constructed to transmit torque from said first coupling part to said second coupling part;
   said first coupling part having abutment means;
   said interconnecting member releasably engaging said abutment means of said first coupling part;
   pivot means connecting said member to said second coupling part;
   spring means exerting a spring force tending to maintain said interconnecting member in engagement with said abutment means;
   said first shaft part being axially displaceable toward said second shaft part in response to an axial load;
   said abutment means being disengageable from said interconnecting member in response to axial displacement of said first shaft part;
   said spring means exerting a spring force tending to axially separate said first and second coupling parts.

2. A shaft coupling having a first coupling part, a second coupling part and an interconnecting member constructed to transmit torque from said first coupling part to said second coupling part;
   said first coupling part having abutment means;
   said interconnecting member releasably engaging said abutment means of said first coupling part;
   pivot means connecting said member to said second coupling part;
   first spring means engaging said interconnecting member and exerting a spring force thereon in a radial direction tending to maintain said interconnecting member in engagement with said abutment means;
   said first shaft part being axially displaceable toward said second shaft part in response to an axial load;
   said abutment means being disengageable from said interconnecting member in response to axial displacement of said first shaft part;
   a second spring means engaging said coupling parts and exerting a spring force thereon tending to axially separate said first and second coupling parts.

3. A shaft coupling having a first coupling part with engagement means on two sides thereof;
   a second coupling part and a pair of interconnecting members pivotally connected to said second coupling part;
   said interconnecting members each releasably engaging said engagement means;
   said interconnecting members being constructed to transmit driving torque from said first coupling part to said second coupling part;
   said first coupling part being axially displaceable toward said second coupling part in response to an axial load;
   said interconnecting members being disengageable from said engagement means in response to axial displacement of said first coupling part whereby said first coupling part is disconnected from said second coupling part;
   said first and second coupling parts having ramp means constructed to cause relative radial displacement between said coupling parts in response to axial displacement of said first coupling part into engagement with said second coupling part.

4. A steering shaft coupling for a motor vehicle having a first steering shaft coupling part with abutment means extending laterally from two of its sides;

a second steering shaft coupling part and a pair of interconnecting members pivotally connected to said second part;

said interconnecting members each having hook shape portions engageable with said abutment means;

spring means urging said hook shape portions of said interconnecting members into interlocking engagement with said abutment means;

said interconnecting members being constructed to transmit torque from said first part to said second part;

said first part being axially displaceable toward said second part in response to an axial load;

said interconnecting members being disengageable from said abutment means in response to axial displacement of said first part toward said second part whereby said first part is disconnected from said second part.

5. A steering shaft coupling for a motor vehicle having a shaft part with parallel lateral sides;

abutment members extending laterally from each of said sides of said shaft part;

a coupling part spaced from the end of said shaft part;

a pair of interconnecting members and hinge means pivotally connecting said members to said coupling part;

said interconnecting members each having a hook shape portion engaging one of said abutment members;

first spring means interposed between said shaft part and said coupling part urging said parts axially in opposite directions;

said first spring means exerting a spring force tending to urge said abutment members into seated engagement with said hook shape portions;

anti-rattle spring means supported by said shaft part and engaging said interconnecting members;

said interconnecting members being constructed to transmit driving torque from said shaft part to said coupling part when said abutment members are seated in said hook shape portions;

said shaft part being axially displaceable against the force of said first spring means into engagement with said coupling part in response to an axial load that exceeds a predetermined minimum;

said hook shape portions being disengaged from said abutment members when said shaft part is in engagement with said coupling part;

at least one of said parts having a ramp surface constructed to displace said parts radially with respect to each other when said parts are displaced axially into engagement with each other.

* * * * *